US010724165B2

(12) United States Patent
Tsiarkezos et al.

(10) Patent No.: US 10,724,165 B2
(45) Date of Patent: Jul. 28, 2020

(54) STABILIZATION OF LOOPED FABRIC SURFACES BY FINE-SCALE EMBOSSING

(71) Applicant: ENGINEERED FLOORS LLC, Dalton, GA (US)

(72) Inventors: Stephen Tsiarkezos, Elkton, MD (US); Dimitri Zafiroglu, Centreville, DE (US); John Joseph Matthews Rees, Chattanooga, TN (US)

(73) Assignee: ENGINEERED FLOORS LLC, Dalton, GA (US)

( * ) Notice: Subject to any disclaimer, the term of this patent is extended or adjusted under 35 U.S.C. 154(b) by 0 days.

(21) Appl. No.: 16/363,367

(22) Filed: Mar. 25, 2019

(65) Prior Publication Data

US 2019/0218698 A1    Jul. 18, 2019

Related U.S. Application Data

(62) Division of application No. 16/003,335, filed on Jun. 8, 2018.

(Continued)

(51) Int. Cl.
*D06C 23/04* (2006.01)
*B32B 5/26* (2006.01)
(Continued)

(52) U.S. Cl.
CPC .............. *D06C 23/04* (2013.01); *B32B 5/024* (2013.01); *B32B 5/026* (2013.01); *B32B 5/06* (2013.01);
(Continued)

(58) Field of Classification Search
CPC ...... D04B 21/02; D04B 21/14; D04B 21/165; D06C 23/04; B32B 5/06; B32B 5/26;
(Continued)

(56) References Cited

U.S. PATENT DOCUMENTS

| 4,705,710 A | 11/1987 | Matsuda |
| 5,888,609 A | 3/1999 | Karttunen et al. |

(Continued)

FOREIGN PATENT DOCUMENTS

| CN | 102965833 A | * | 3/2013 | |
| GB | 1320736 A | * | 6/1973 | ............ D04H 11/08 |
| GB | 1399153 A | | 6/1975 | |

OTHER PUBLICATIONS

Google translation of CN 102965833A. (Year: 2013).*
International Search Report and Written Opinion in International Application No. PCT/US2018/036601 dated Aug. 24, 2018.

*Primary Examiner* — Cheryl Juska
(74) *Attorney, Agent, or Firm* — Patent Portfolio Builders PLLC

(57) ABSTRACT

A fabric made of yarns interlooping with each other or passing through an inner layer at looping intervals. The fabric is embossed with a micro-pattern extending into the yarns or into a layer underneath the fabric. The micro-pattern contains a pre-defined pattern of a plurality of binding points attaching the yarns to the inner layer or to the added underlayer. This micro-pattern has an inter-point spacing between adjacent binding points that is less than the interlooping intervals. The fabric can also be embossed with a macro-pattern separate from and coarser than the micro-pattern. The macro-pattern establishes a desired aesthetic in the fabric, and the micro-pattern does not interfere with the desired aesthetic.

7 Claims, 12 Drawing Sheets

Related U.S. Application Data

(60) Provisional application No. 62/517,440, filed on Jun. 9, 2017.

(51) Int. Cl.

| | | |
|---|---|---|
| *D03D 27/00* | (2006.01) | |
| *D04B 21/02* | (2006.01) | |
| *D05C 17/02* | (2006.01) | |
| *D04B 1/22* | (2006.01) | |
| *D04B 21/20* | (2006.01) | |
| *D04B 1/12* | (2006.01) | |
| *D04B 21/08* | (2006.01) | |
| *D04B 1/04* | (2006.01) | |
| *B32B 5/06* | (2006.01) | |
| *B32B 5/02* | (2006.01) | |
| *D04B 21/16* | (2006.01) | |
| *D04B 21/14* | (2006.01) | |

(52) U.S. Cl.
CPC ............... *B32B 5/26* (2013.01); *D03D 27/00* (2013.01); *D04B 1/04* (2013.01); *D04B 1/12* (2013.01); *D04B 1/22* (2013.01); *D04B 21/02* (2013.01); *D04B 21/08* (2013.01); *D04B 21/14* (2013.01); *D04B 21/165* (2013.01); *D04B 21/20* (2013.01); *D05C 17/026* (2013.01); *B32B 2250/20* (2013.01); *B32B 2262/0276* (2013.01); *B32B 2471/02* (2013.01); *D05D 2209/10* (2013.01); *D05D 2305/30* (2013.01); *D10B 2331/04* (2013.01); *D10B 2401/062* (2013.01); *D10B 2403/0111* (2013.01); *D10B 2403/0112* (2013.01); *D10B 2503/04* (2013.01); *D10B 2505/08* (2013.01); *Y10T 428/23907* (2015.04); *Y10T 428/23929* (2015.04); *Y10T 428/23957* (2015.04); *Y10T 428/23979* (2015.04); *Y10T 428/23986* (2015.04)

(58) Field of Classification Search
CPC   B32B 2250/20; B32B 2471/02; D03D 27/00; D05C 17/026; D10B 2503/04; Y10T 428/23907; Y10T 428/23929; Y10T 428/23957; Y10T 428/23979; Y10T 428/23986

See application file for complete search history.

(56) References Cited

U.S. PATENT DOCUMENTS

| | | |
|---|---|---|
| 6,855,392 B2 | 2/2005 | Wildeman et al. |
| 7,255,761 B2 | 8/2007 | Zafiroglu |
| 7,425,359 B2 | 9/2008 | Zafiroglu |
| 7,431,975 B2 | 10/2008 | Zafiroglu |
| 7,622,408 B2 | 11/2009 | Zafiroglu |
| 8,216,659 B2 | 7/2012 | Zafiroglu |
| 9,243,359 B2 | 1/2016 | Zafiroglu |
| 2004/0106345 A1 | 6/2004 | Zafiroglu et al. |
| 2004/0106346 A1 | 6/2004 | Zafiroglu et al. |
| 2004/0115388 A1 | 6/2004 | Wildeman et al. |
| 2005/0227038 A1 | 10/2005 | Zafiroglu et al. |
| 2006/0183389 A1 | 8/2006 | Zafiroglu |
| 2008/0010793 A1* | 1/2008 | Wildeman ......... D06B 11/0089 28/100 |
| 2008/0014807 A1 | 1/2008 | Auck et al. |
| 2012/0082820 A1 | 4/2012 | Salsman |
| 2012/0122365 A1 | 5/2012 | Erickson |
| 2013/0273297 A1 | 10/2013 | Zafiroglu et al. |

* cited by examiner

STABILIZATION OF LOOPED FABRIC SURFACES BY FINE-SCALE EMBOSSING

CROSS-REFERENCE TO RELATED APPLICATIONS

This application is a Divisional of U.S. application Ser. No. 16/003,335, filed Jun. 8, 2019, which claims priority to U.S. Provisional Patent Application No. 62/517,440, filed Jun. 9, 2017, the entire contents of which are incorporated herein by reference.

TECHNICAL FIELD

Embodiments of the subject matter disclosed herein relate to embossing looped fabrics and textile-faced composite floor-coverings.

BACKGROUND

Cushioning textile fabrics are constructed by weaving, knitting, tufting or stitch-bonding, with looping surface yarns engaging each other or looping in and out of a "backing" or "substrate" at intervals having a relatively large spacing. These textile fabrics require stabilization of the surface yarns for use in applications requiring high resistance to abrasion and resistance to planar deformation such as flooring, wallcovering and upholstery. Stabilization of the surface can be achieved by inter-bonding yarns throughout the structure or by locally bonding the lower parts of the loops, located away from the surface. However, inter-bonding of the yarns throughout the structure to a degree sufficient to provide abrasion resistance and dimensional stability under severe end use tends to stiffen the surface of the textile fabric and reduce cushion.

As an alternative, the entire backside of the fabric can be bonded with soft adhesives and optionally attached to various "secondary backings" as in the case of tufted fabrics with the entire backside of the fabric attached adhesively to a backing. While continuous bonding underneath can stabilize the dimensions and the surface of the fabric against abrasion, wear issues and edge fraying remain a problem for fabrics formed with yarn loops spaced apart. In particular, the upper parts of the loops can still degrade with abrasion. Moreover, at the cut edges that are not anchored, relatively long ends of yarns can fray and fuzz during use.

Regarding continuous bonding of the flat or textured backside of looped yarn fabrics, effective bonding also requires highly-fluid low-viscosity adhesives. Examples of these highly-fluid low-viscosity adhesives include latexes and polymeric binders and powdered adhesives carried by liquids. Localized activation also requires controlled adhesive flow into the lower portions of the yarns as well as into and out of the backing or substrate. This controlled adhesive flow is required to be directed into the desired portions of the textile fabric without contaminating the exposed loops of the surface yarns. While avoiding the exposed surface yarns, the process of controlled adhesive flow, exemplified by the common use of latex adhesives applied to the back-laps and the backside of the "primary backings" of a tufted fabric, requires the application of a substantial amount of adhesive to reach all surfaces and to achieve strong bonds. This substantial amount of adhesive stiffens the textile fabric.

As an alternative to controlled adhesive flow, dry adhesives are introduced into or around the backing or substrate. Dry polymeric low melting adhesives tend to have relatively high melt viscosities and require high pressures at elevated temperatures to achieve bonding. These high melt viscosities and the associated high bonding pressures result in "crushing" of the fabric, the loss of thickness and cushion, and increased planar stiffness. While these results are acceptable and even desirable for certain types of "hard-surface" floorcoverings or wallcoverings, they are not suitable for soft-faced floor or wallcoverings and for fabrics requiring conformability, such as upholstery.

A new family of cushioning textile-faced composite structures, aimed mainly at floorcoverings or wallcoverings, utilizes a relatively thick cushioning backing placed under and bonded to a thinner fabric face layer. The fabric face layer may be formed with yarns and can be flat or highly textured. Moreover, the fabric face layer itself may be textured after forming the composite structure, for example, by embossing the desired texture into the fabric face layer. A highly textured surface is usually formed by embossing patterns extending into the composite structure to depths exceeding the original thickness of the fabric face layer. Unless the fabric face layer is severely crushed, collapsed and rigidified across the entire area of the fabric face layer by applying heat and pressure from the top of the composite, yarns in the fabric face layer are not sufficiently stabilized along their entire lengths. For tufted constructions, looping face yarns, which are placed at relatively large intervals along the fabric face layer on a "primary backing", can easily loosen and can even pull free. For composite structures that are cut into individual tiles such as modular flooring tiles, these looping face yarns can disintegrate along cut edges and "fuzz" as the upper parts of the sectioned loops remain free and burst open upon contact.

Deeply-textured embossed patterns on a textile fabric or composite structure can provide the desired combination of durability, surface stability and dimensional stability and can add plush-aesthetics, cushion, thermal insulation and better planar conformability. However looped textile fabrics and composite structures deeply embossed without prior stabilization with adhesives fail to achieve the desired cut-edge-stability in the face yarns. This lack of edge-stability results from the less-compressed "elevated" areas remaining less-bonded or non-bonded as compared to the more compressed "depressed" areas when the fabric face layers are directly laminated onto a backing as they are embossed. These elevated and less-compressed areas remain vulnerable to wear, abrasion, deterioration, unraveling or "fuzzing", especially along cut edges.

Tufted yarns are looped by insertion into a primary backing without the loops engaging each other. The tufted yarns also require larger spaces between insertions as compared to knit, stitch-bonded or woven constructions. Unless the entire structure under the pile of tufted yarns, including the "back-laps", is engaged with and enveloped by adhesive, tufted yarns are subject to tuft pull-out. Therefore, tufted yarns require the use of significant amounts of adhesive, which renders tufted yarn fabrics unsuitable for flexible stand-alone end uses such as upholstery, and for adoption into composites relying on soft backings for cushion. Stand-alone tufted fabrics stabilized with low amounts of adhesives without stiffening the face pile loops, or the entire fabric, and without the total loss of the looped face appearance, are desirable.

Given the limitations of various types of conventional applications of yarns, and particularly involving their use as face layers in modular composite tile flooring, the need exists for the stabilization of fabrics formed with loops of yarns having the desired softness, cushion and wear prop-

SUMMARY

Exemplary embodiments are directed to a method for stabilizing a looped-yarn fabric along the entire surface and along cut edges. The looped-yarn fabric is stabilized without causing the loss of a generally looped surface structure and without severely stiffening the fabric or the surface loops. The thickness of the original fabric is reduced by approximately 20 to 60%, preferably by less than 40%. In addition, the frequency of the loops is increased, and the regularity of the exposed loops is altered. However, the surface of the fabric maintains a loopy appearance.

Exemplary embodiments are also directed to a method for using a looped-yarn fabric stabilized in accordance with embodiments described herein as a surface layer in composites and floor-coverings that utilize an attached backing layer for cushion. The looped-yarn fabric is attached to the backing layer and used as the surface layer in composites and floor-coverings without losing the looped characteristic and without severely stiffening the surface loops. In one embodiment, after attachment the thickness of the original looped-yarn fabric is reduced by about 20-60%, preferably by less than 40%, while the overall thickness of the composite changes by a much lower percentage.

In accordance with embodiments described herein, patterns finer and more frequent than the frequency that the yarn loops into the plane of the fabric are referred to as "micro-patterns". Deeper and coarser embossing patterns where the spacing exceeds the original spacing of yarn loops are referred to as "macro-patterns". The resulting densely-embossed looped fabrics or composites have highly-stabilized cut edges and maintain durability along the entire surface area of the fabric face layer, including all elevated and depressed areas. Fabrics stabilized by micro-embossing, i.e., embossing with micro-patterns, with a regular or random pattern finer than the pattern of loop repetition contain two superimposed patterns, the original pattern of yarn loops and the micro-pattern. These stabilized fabrics are relatively flat.

Fabrics receiving a second regular or random macro-embossing, i.e., embossing with macro-patterns, after being stabilized with a micro-pattern contain three superimposed patterns and are highly textured or three-dimensional. In one embodiment, the second and optional coarser embossing with the macro-pattern is performed with the fabric containing the embossed micro-pattern placed over a soft back-up surface such as silicon rubber. In one embodiment with a composite containing a cushioning backing, the second optional embossing with the macro-pattern is performed directly over the fabric that was pre-embossed with a micro-pattern, i.e., the pre-stabilized-fabric, placed over the cushioning backing before embossing with the macro-pattern and simultaneously attaching it to the backing.

Exemplary embodiments are also directed to a method for using face layers stabilized in accordance with embodiments described herein in a composite used as a floor-covering that relies primarily or entirely on a backing layer for providing the desired cushion Exemplary embodiments are directed to methods for stabilizing looped-yarn fabrics that use reduced or lower amounts of adhesives to stabilize the fabrics. Suitable looped-yarn fabrics include, but are not limited to, woven, knit, stitch-bonded and tufted fabrics.

Exemplary embodiments facilitate the use of thinner tufted fabrics in high-durability end uses without consuming a high weight of yarns. Tufted fabrics can provide substantial cover but very limited cushion at very low tufted yarn weights and thin piles. Stabilizing tufted fabrics with relatively low amounts of adhesives while maintaining a looped face appearance and avoiding stiffening the face structure or the entire sheet with high amounts of adhesives, yields tufted fabrics suitable for use as durable and abrasion resistant fabrics. These stabilized tufted fabrics can also be combined with cushioning backing layers to serve as the face layers of composite floorcoverings, wallcoverings, or upholstery. In addition, thin pile tufted fabrics can be formed with polyester yarns, which offer durability and resistance to thermal or hygroscopic expansion or contraction, but lack resilience.

Polyester yarns, as opposed to polyolefin or polyamide yarns, when formed into a pile tend to bend and "mat-down". This bending and matting of the polyester yarns results in a loss of cushion and fibrous face aesthetics. Therefore, the use of ordinary polyester yarns is limited to forming tufted flooring such as in "shag" carpeting where the sidewise bending of the yarns and pile and the consumption of large amounts of yarn are acceptable. Polyamide yarns such as nylon yarns resist bending and recover quickly from bending. However, polyamide yarns have a higher coefficient of thermal expansion and tend to be affected by temperature and moisture. Polyolefin yarns, while not affected by moisture, have even higher coefficients of thermal expansion and contraction than polyamide yarns. Fabric surfaces formed by tufted nylon or polypropylene and incorporated into modular or tile flooring require dimensional stabilization with heavy layers of glass fibers. With a pre-stabilized flexible and thin tufted fabric, polyester can be used in the flooring composites relying upon a soft backing for cushion, without requiring extra stabilization and without negatively affecting the recycling ability of the product.

Exemplary embodiments are directed to a fabric containing a plurality of yarns forming a plurality of loops, the plurality of loops interconnected at a plurality of interlooping points spaced across the fabric by interlooping distances between pairs of interlooping points. In one embodiment, the fabric is a knit fabric or a woven fabric. The fabric includes an embossed micro-pattern disposed on a first face of the fabric. The embossed micro-pattern contains a plurality of binding points extending into the first face and binding the yarns in the plurality of yarns. Adjacent binding points in the plurality of binding points are separated by a binding point distance, and the binding point distance is less than the interlooping distances.

In one embodiment, the fabric includes a sub-layer in contact with a second face of the fabric opposite the first face. The binding points in the plurality of binding points extend into the sub-layer and interbond the sub-layer and the yarns. In on embodiment, the fabric is a stitchbonded fabric containing a substrate. The interloping points in the plurality of interlooping points are points of insertion of the plurality of loops into the substrate. The interloping distance is the spacing between the points of intersection in either a first direction across the fabric or a second direction perpendicular to the first direction. The binding points extend into the substrate and interbond the substrate and the yarns. In one embodiment, the substrate comprises a low melt material. In one embodiment, the fabric also includes at least one additional low melt layer disposed between the substrate and at least one of the first face a second face opposite the first face.

In one embodiment, the fabric is a tufted fabric with a primary backing. The interloping points in the plurality of interlooping points are the tufting points through the primary backing. The interlooping distance is the spacing between the tufting points in either a length direction or a width direction across the fabric. The binding points extend into the primary backing and interbond the primary backing and the yarns. In one embodiment, the primary backing includes low melt components. In one embodiment, the fabric further includes at least one additional low melt layer disposed between the primary backing and at least one of the first face a second face opposite the first face.

In one embodiment, the fabric further includes an embossed macro-pattern separate from the micro-pattern. The macro-pattern has a plurality of elevated areas and a plurality of depressed areas that establish a desired aesthetic in the fabric. Adjacent elevated areas and adjacent depressed areas are separate by a spacing interval, and the spacing interval is greater than the interlooping distances. In one embodiment, the fabric has an initial thickness and an embossed thickness following application of the micro-embossed pattern. The embossed thickness is from about 40% to about 80% of the initial thickness. In one embodiment, the fabric has an initial thickness and an embossed thickness following application of the micro-embossed pattern, and the embossed thickness is at least about 60% of the initial thickness. In one embodiment, the yarns in the plurality of yarns include polyester.

Exemplary embodiments are also directed to a textile composite containing a fabric having a plurality of yarns forming a plurality of loops. The loops in the plurality of loops are interconnected at a plurality of interlooping points spaced across the fabric by interlooping distances between pairs of interlooping points. The fabric also includes an embossed micro-pattern disposed on a first face of the fabric. The embossed micro-pattern includes a plurality of binding points extending into the first face and binding yarns in the plurality of yarns. Adjacent binding points in the plurality of binding points are separated by a binding point distance, and the binding point distance is less than the interlooping distances. The textile composite also includes a cushioning backing attached to a second face of the fabric opposite the first face using adhesive.

In one embodiment, the fabric is a knit fabric or a woven fabric, and the fabric also includes a sub-layer in contact with the second face of the fabric. The binding points in the plurality of binding points extend into the sub-layer and interbond the sub-layer and the yarns. In one embodiment, the fabric is a stitchbonded fabric containing a substrate. The interloping points in the plurality of interlooping points are points of insertion of the plurality of loops through the substrate. The interloping distance is the spacing between the points of intersection in either a length direction or a width direction across the fabric. The binding points extend into the substrate and interbond the substrate and the yarns. In one embodiment, the fabric is a tufted fabric having a primary backing. The interloping points in the plurality of interlooping points are the tufting points through the primary backing. The interloping distance is the spacing between the tufting points in either a length direction or a width direction across the fabric. The binding points extend into the primary backing and interbond the primary backing and the yarns.

In one embodiment, the textile composite also includes an embossed macro-pattern separate from the micro-pattern. The macro-pattern has a plurality of elevated areas and a plurality of depressed areas that establish a desired aesthetic in the textile composite. Adjacent elevated areas and adjacent depressed areas are separate by a spacing interval, and the spacing interval greater than the interlooping distances.

Exemplary embodiments are also directed to a method for stabilizing a fabric. A fabric is formed with a plurality of yarns forming a plurality of loops. The loops in the plurality of loops are stabilized or interconnected at a plurality of interlooping points spaced across the fabric by interlooping distances between pairs of interlooping points. A first face of the fabric is embossed with a micro-pattern having a plurality of binding points extending into the first face and binding yarns in the plurality of yarns. Adjacent binding points in the plurality of binding points are separated by a binding point distance, and the binding point distance less than the interlooping distances. In one embodiment, the fabric containing the micro-pattern is embossed with a macro-pattern separate from the micro-pattern. The macro-pattern has a plurality of elevated areas and a plurality of depressed areas that establish a desired aesthetic in the fabric. Adjacent elevated areas and adjacent depressed areas are separated by a spacing interval, and the spacing interval greater than the interlooping distances.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
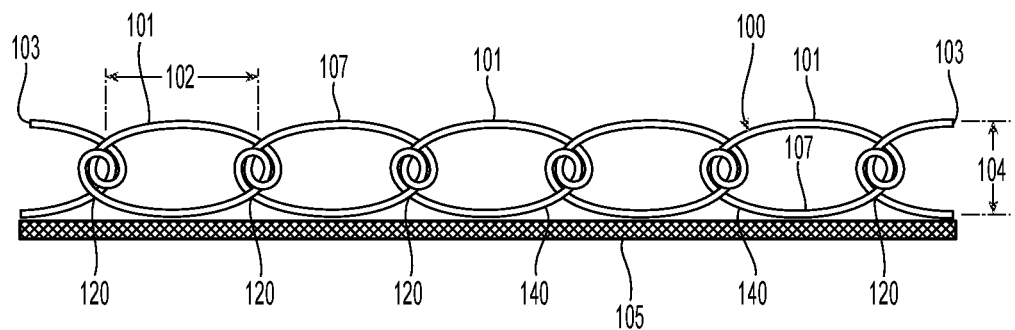
FIG. 1 is a schematic representation of a cross-section of an embodiment of a looped fabric.

Referring initially to FIG. 1, a looped yarn fabric 100 includes a plurality of yarns 107 that form a plurality of interlooping loops extending along and across the looped yarn fabric. Suitable yarns include, but are not limited to, polyamide or nylon, polypropylene, polyolefin, acrylic, polyester, wool and cotton. Preferably, the yarns are polyester yarns. A knit schematic is shown in FIG. 1. The yarns form a plurality of upper level loops 101, and a plurality of lower level loops 140. Examples of knit looped yarn fabrics include warp knits involving multiple yarn ends looping in one direction and interconnecting across in the cross direction, or weft knit fabrics with continuous yarns connecting cross rows as they move along. The upper loops 101 are the knit "overlaps" and the lower level loops 140 are the knit "underlaps", or vice versa. Woven fabrics (not shown) forming loops with multiple yarns in the warp direction inter-engaging single or multiple yarns in the weft direction, can also be used. The looped yarn fabric has an overall thickness 104. The upper level loops or the first yarn and the lower level loops of the second yarn are interlooped at a plurality of interlooping points 120. The interlooping points are spaced from each other and repeat with an interlooping distance or spacing 102. Any single loop along a given yarn in the looped yarn fabric is contained within the interlooping distance. In one embodiment, an optional sub-layer 105 is placed under the looped yarn fabric adjacent the lower level loops 140. In one embodiment, the sub-layer is a low melting thermoplastic sheet. Cutting the looped yarn fabric results in cut edges 103 of the looped yarn fabric. When the yarns in the plurality of yarns are cut along the cut edges, the point at which a given yarn is cut can be located at one of the interlooping points or between a pair of interlooping points 120. In conventional looped yarn fabrics wherein the interlooping points are spaced relatively far from each other, the cut edges that pass through yarns between interlooping points manifest fuzzing along the cut edges. Moreover, the fabric is relatively unstable along its entire surface.

Figure 2:
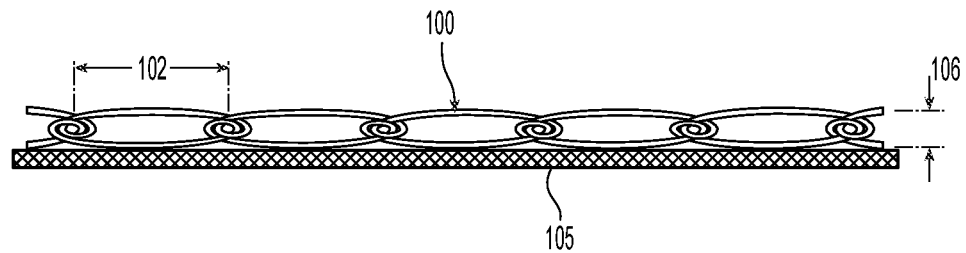
FIG. 2 is a schematic representation of the looped fabric of FIG. 1 calendered flat with heat to bond the surface loops.
Figure 3:
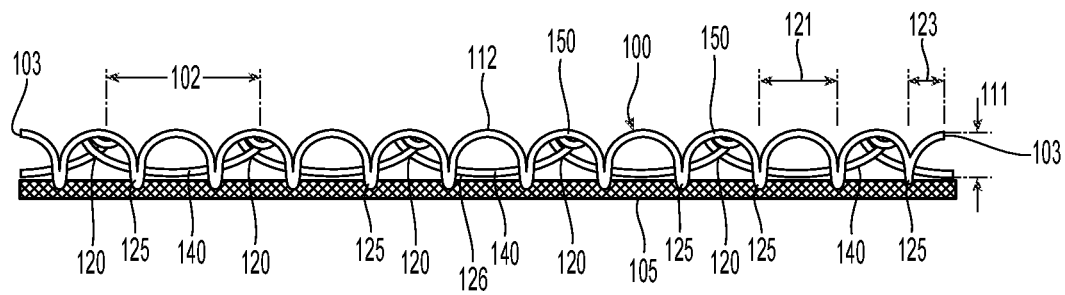
FIG. 3 is a schematic representation of a cross-section of the fabric of FIG. 1 embossed with a micro-pattern.

Referring now to FIG. 2, in one embodiment the looped yarn fabric 100 in combination with the sub-layer 105 as illustrated in FIG. 1 is uniformly calendered with heat sufficient to melt the sub-layer 105 and inter-bond all elements of the looped yarn fabric 100. This calendering, however, reduces the original thickness 104 (FIG. 1) to a calendered thickness 106, which is significantly less than the original thickness. The resulting calendered looped yarn fabric is unacceptably stiff and lacks body, bulk and cushion. Referring to FIG. 3, exemplary embodiments are directed to the fabric, i.e., the looped yarn fabric 100 with an embossed micropattern extending into or disposed on a first face 112 of the looped yarn fabric. As illustrated, the first face contains the first yarn and the plurality of upper loops 101. The looped yarn fabric includes the plurality of loops including the upper loops 101 and lower loops 140 that are stabilized at the plurality of binding points 125 spaced across the fabric by the embossed binding distances 121.

In one embodiment, the embossed micro-pattern includes a plurality of binding points 125 extending into the first face and binding together yarns. Adjacent binding points in the plurality of binding points are separated by a binding point distance 121. The binding point distance is less than the interlooping distances 102. The resulting bonds in the binding points can repeat at the binding point distances, which are either regular or random, across the area of the looped yarn fabric. The length or amount of yarn 123 between the cut edge 103 and the nearest binding point is less than the binding point distance. Therefore, embossing with the micro-pattern stabilizes the looped yarn fabric without imparting excessive stiffness or losing bulk. The cut edges are improved as the free span between adjacent bonds in the micro-pattern is significantly smaller than the original interlooping point spacing. The surface stability and abrasion resistance of the fabric is also improved.

In one embodiment, the looped yarn fabric includes the sub-layer 105 in contact with a second face 126, e.g., the lower loops, of the fabric opposite the first face. The binding points in the plurality of binding points extend at least partially into the sub-layer, interbonding the sub-layer and one or more yarns.

In embodiment, the fabric embossed with the micro-pattern, either with or without the sub-layer, has an embossed thickness 111 following application of the micro-pattern that is from about 40% to about 80% of the initial thickness 104 of the fabric. In one embodiment, the embossed thickness is at least about 60% of the initial thickness. In one embodiment, the looped yarn fabric 100 either alone or in combination with the sub-layer 105 is embossed with the micro-pattern using an embossing or bonding tool (not shown) having projections corresponding to the plurality of binding points 125 formed between the looped yarn fabric and the sublayer. In one embodiment, the low-melt sub-layer is placed on a side or surface of the looped yarn fabric opposite the embossing tool. In one embodiment, embossing is conducted at a temperature higher than the melting point of the sub-layer 105 but lower than the melting point of the yarns in the plurality of yarns.

In one embodiment, the sub-layer is not used, and only the looped yarn fabric is embossed with the micro-pattern. The temperature of the embossing tool is sufficiently close to the melting point of the yarns in the looped yarn fabric to produce the plurality of bonds at the binding points between the upper loops and the lower loops of yarns. The embossing tool can be applied from either the top surface or the bottom surface of the looped yarn fabric. The resulting micro-pattern loops, either with or without the sublayer, have heights and shapes that vary depending upon the location of a micro-pattern loop and bonds relative to the original inter-engagement inter-looping points 120 of the loops in the looped yarn fabric. Some of the newly formed loops contain interlooping yarn junctures 150, as shown.

Figure 4:
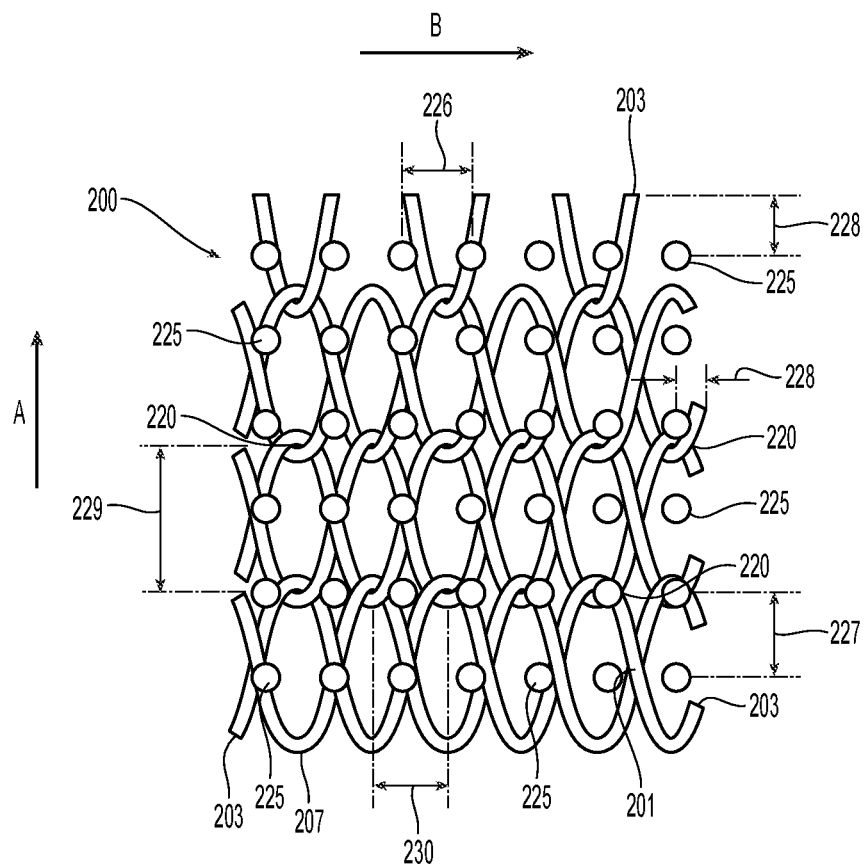
FIG. 4 is a schematic representation of a first face of a looped fabric embossed with a micro-pattern.

Referring now to FIG. 4, the first face 112 of an embodiment of a looped yarn fabric 200 with embossed micro-pattern is illustrated. The first face includes the upper loops 201 formed by the plurality of yarns 207. The yarns and loops extend along a first direction, arrow A, or length of the looped yarn fabric, and adjacent yarns and loops are spaced from each other along a second direction, arrow B, or width of the looped yarn fabric. The first direction is perpendicular to the second direction. Each loop extends between two interlooping points 220. The micro-pattern includes a plurality of discrete binding points 225 extending into the first face and binding at least the yarns in the upper loops. As illustrated, the discrete binding points are arranged as a grid of binding points. However, other arrangements of binding points can be used including random arrangements. In one embodiment, the grid is aligned with the first and second directions across the looped yarn fabric. Each binding point is illustrated as a circular binding point; however, other shapes of binding points can be used including rectangular, triangular, oblong, star-shaped and x-shaped binding points. In addition to discrete binding points, the binding points can be arrangement of continuous bind lines or segments of binding lines. Adjacent binding points are separated from each other by a first direction binding point distance 226 and a second direction binding point distance 227 perpendicular to the first direction binding point distance. In one embodiment, the first and second direction binding points distances are less than the first direction interlooping distances 229 and the second direction interlooping distances 230. Therefore, a distance of separation 228 between any given binding point 225 and the cut edge 203 running in either the first or section direction across the looping yarn fabric is less than the first direction interlooping distances 229 and the second direction interlooping distances 230. This spacing also provides for stabilizing the fabric along cut edges that run across the fabric in directions other than parallel to the first and second directions. In one embodiment, the fabric also includes an embossed macro-pattern separate from the embossed micro-pattern. The macro-pattern is defined by arrangements of a plurality of elevated areas and a plurality of depressed areas that establish a desired overall aesthetic in the fabric. Desired aesthetics include, for example, cross-hatching patterns. Adjacent elevated areas and adjacent depressed areas are separate by a spacing interval, and this spacing interval is greater than the interlooping distances. Suitable methods for establishing the macro-pattern including compressing or calendering the fabric with the desired heat and pressure using a platen containing the desired macro-pattern.

Figure 5:
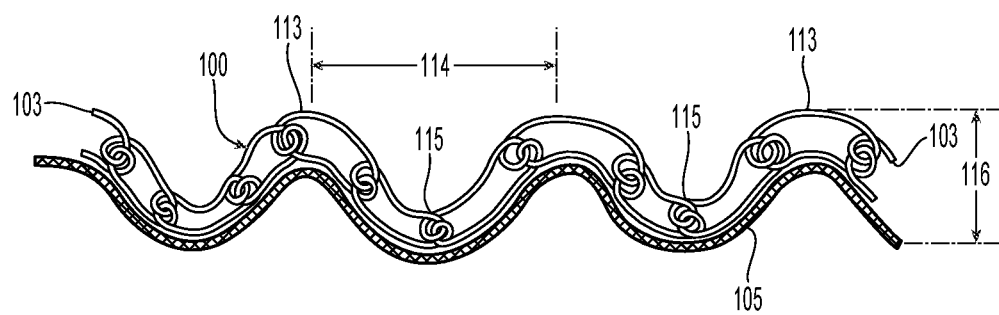
FIG. 5 is a schematic representation of a cross-section of the looped fabric of FIG. 1 embossed with a macro-pattern.

Referring now to FIG. 5, a macro-pattern is embossed completely into the looped yarn fabric 100 and sub-layer 105 without the application of a micro-pattern. In one embodiment, the macro-pattern is embossed with the looped yarn fabric and sub-layer placed against a soft surface, for example, silicon rubber. The macro-pattern is a gross and deep macro-pattern that repeats with a large spacing interval 114. In one embodiment, the embossing tool temperature is less than the melting point of the yarns in the looped yarn fabric and above the melting point of the sub-layer 105. The result is a three-dimensional deep texture having elevated areas 113 and depressed areas 115. The loops within the depressed areas are collapsed and inter-bonded; however, the loops in the exposed elevated areas have exposed upper portions and are still susceptible to be cut free at the edges 103. The macro-pattern produces an overall thickness 116 between the elevated areas and depressed areas.

Figure 6:
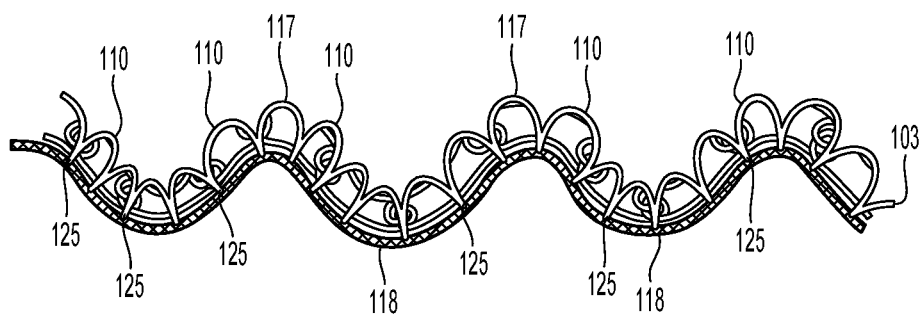
FIG. 6 is a schematic representation of a cross-section of the looped fabric of FIG. 3 embossed with a macro-pattern.

Referring now to FIG. 6, the looped yarn fabric that was pre-embossed with the micro-pattern and stabilized as illustrated in FIG. 3. is embossed with the same macro-pattern as illustrated in FIG. 5. The macro-pattern produces elevated areas 117 and depressed areas 118. However, the looped yarn fabric also contains the plurality of bonds at the binding points 125 and micro-pattern loops 110 of the micro-pattern embossing. The result is a macro-patterned looped yarn fabric with stable edges 103.

Figure 7:
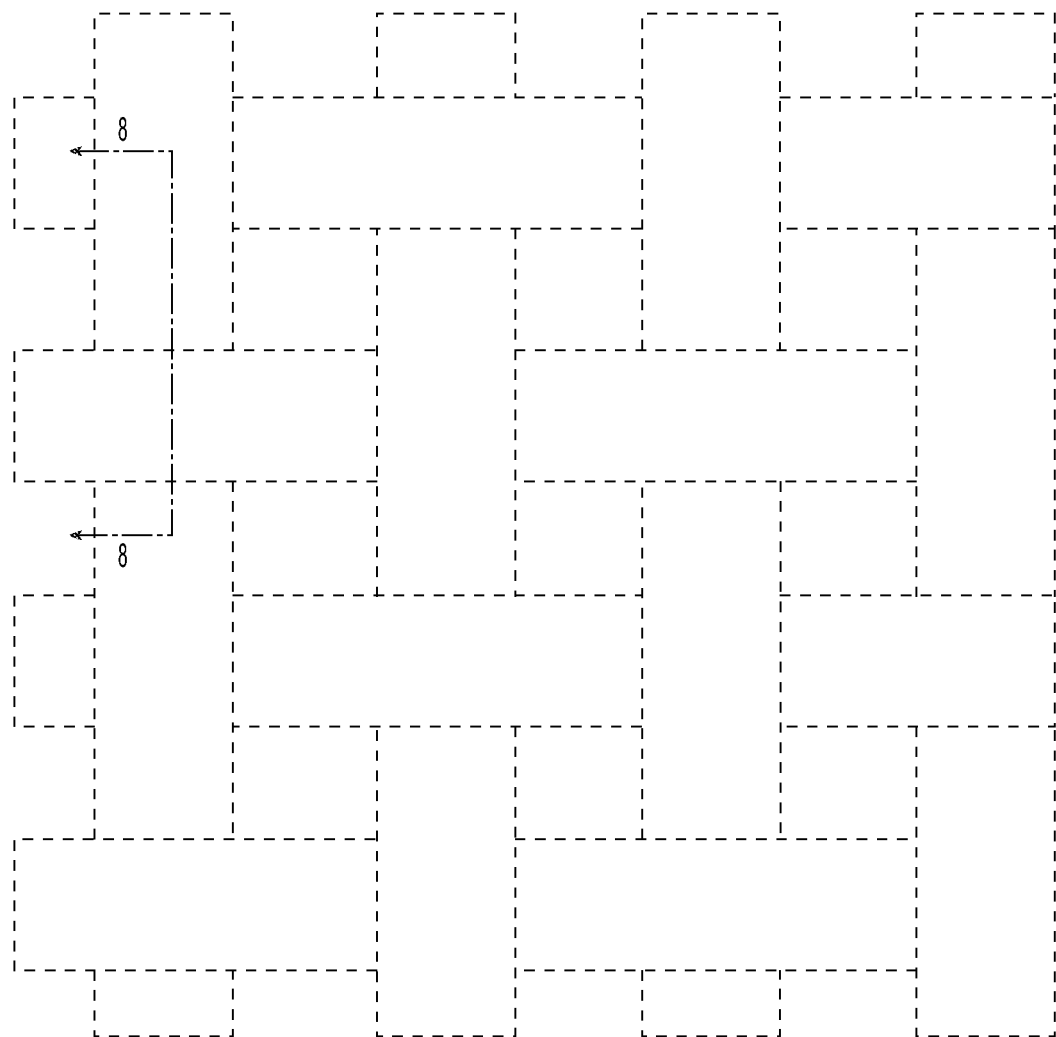
FIG. 7 is a schematic representation of a macro-pattern.
Figure 8:
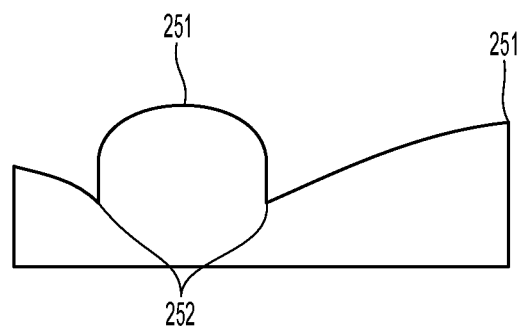
FIG. 8 is a view through line 8-8 of FIG. 7.

Referring to FIG. 7, in one embodiment, the macro-pattern 250 when viewed from the first face of the fabric produces a cross-hatch or woven overall aesthetic. As illustrated in FIG. 8, this aesthetic is created using a embossed macro-pattern of elevated areas 251 and depressed areas 252 extending at least partially or completely through the looped yarn fabric or looped yarn fabric and sublayer. The embossed micro-patterns and macro-patterns described above can be applied to different types of fabrics containing yarns formed in loops extending between interlooping points.

Figure 9:
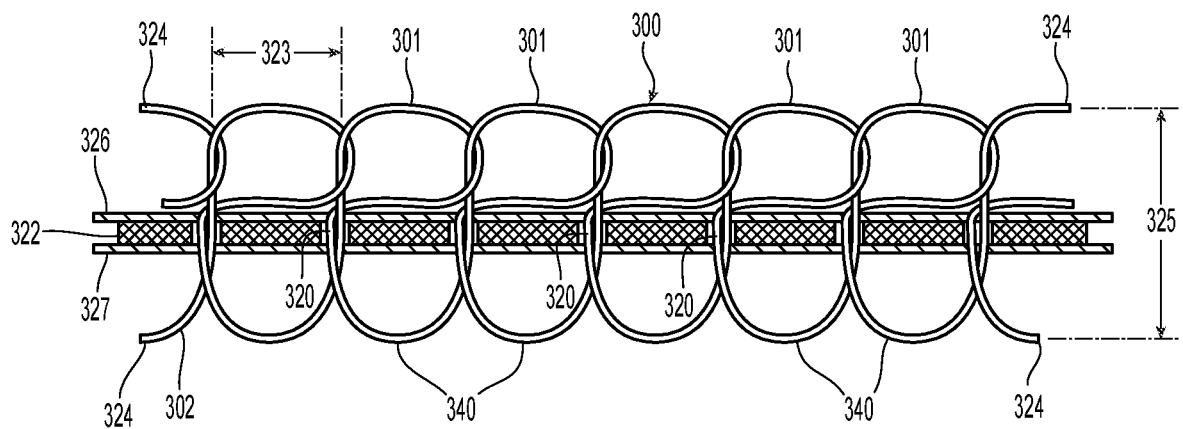
FIG. 9 is a schematic representation of a cross-section of an embodiment of a stitch-bonded fabric.

Referring now to FIG. 9, in one embodiment, the fabric 300 is a stitchbonded fabric containing a substrate 322. Suitable stitch-bonded substrates are known and available in the art. In one embodiment, the substrate is a low-melting layer. In another embodiment, the substrate contains un-activated low-melt adhesives. In one embodiment, the fabric includes at least one of a first optional layer 326 and a second optional layer 327. In one embodiment, the first optional layer contains a low-melt adhesive and is placed on a first side of the substrate. In one embodiment, the second optional layer contains a low-melt content is placed on a second side of the substrate opposite the first side. In one embodiment, both the first and second optional layers are placed on the same side of the substrate with the first optional layer disposed between the substrate and the second optional layer.

The fabric contains a plurality of yarns, and each given yarn 302 in the plurality of yarns forms the plurality of upper level loops 301 corresponding to the first face on a first side of the substrate and a plurality of lower level loops 340 corresponding to the second face on the second side of the substrate. The upper level loops and lower level loops extend between pairs of interlooping points 320. In the stitchbonded fabric, the interlooping points correspond to points of insertion of the yarn and the plurality of loops through the substrate. The interlooping distance 323 is the spacing between the points of intersection in either the first direction across the fabric or the second direction perpendicular to the first direction.

The stitch-bonded fabric, substrate, and first and second optional layers, if any, have an initial thickness 325. The cut ends 324 of the stitch-bonded fabric expose the yarns in the loops, which results in fraying of the ends of the cut stitch-bonded fabric.

As discussed above with respect to a knit fabric and illustrated in FIG. 2, the stitch-bonded fabric 300 including the substrate and any optional low melt layers can be sufficiently calendered flat to inter-bond all loops, substrates and layers. However, stability of the stitch-bonded fabric is not achieved until the thickness of the fabric is reduced to a calendered dimension that is significantly less than the original thickness 325, resulting in a stitch-bonded fabric that is very stiff and lacks bulk and cushion.

Figure 10:
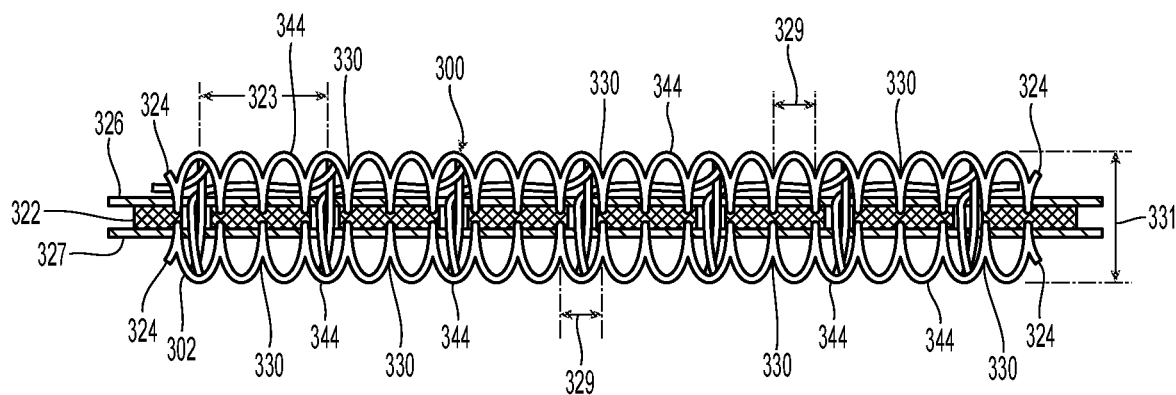
FIG. 10 is a schematic representation of a cross-section of the stitch-bonded fabric of FIG. 9 embossed with a micro-pattern.

Referring now to FIG. 10, the stitch-bonded fabric 300 is embossed with a micro-pattern and bonded to one or more of the first and second sides of the substrate 322 with or without using the optional first and second layers 326, 327 at a plurality of binding points 330. In one embodiment, the micro-pattern is embossed on at least one of the upper level loops on the first face of the fabric and the lower level loops on the second face of the fabric. In one embodiment, the micro-pattern is embossed on both the upper level loops on the first face of the fabric and the lower level loops on the second face of the fabric. Suitable micro-patterns and methods for embossing micro-patterns are disclosed herein. In one embodiment, separate binding points are created on the first side and the second side of the substrate. In another embodiment, each binding point passes completely through the substrate, from the first side to the second side; therefore, a given binding point binds the yarn at a given location on either side of the substrate.

In general, the micro-pattern repeats at intervals corresponding to the binding point distance 329 between binding points. The binding point distance is less than the interlooping distances. The upper level loops and lower level loops are compressed or collapsed, and a plurality of new shallower and irregular loops 344 are created. In one embodiment, the shallower and irregular loops have varying heights. The fabric has a micro-pattern embossed thickness 331 that represents a reduction of from about 20% to about 60% from the original thickness 325. In one embodiment, at least 40% and preferably at least 80% of the original thickness 325 is maintained. The first face and the second face of the fabric maintains a loopy structure, and the cut edges 324 are stable.

In one embodiment, the stitch-bonded fabric embossed and stabilized with the micro-pattern as illustrated in FIG. 10, is subsequently embossed with a macro-pattern (not shown). Suitable macro-patterns and methods for embossing with a macro-pattern are discussed herein and illustrated in FIGS. 5-8. The macro-pattern produces elevated areas and depressed areas; however, the stitch-bonded fabric also contains the plurality of bonds 330 and micro-pattern loops 344 of the micro-pattern embossing on both the first face and the second face. The result is a macro-patterned stitch-bonded fabric with stable elevated areas and stabilized edges. The irregular loops 344 at the elevated areas maintain their looped textile aesthetic. The stitch-bonded fabric has a resulting overall thickness comparable to a stitch-bonded fabric that has been embossed with only a macro-pattern, i.e., no micro-pattern embossing.

Figure 11:
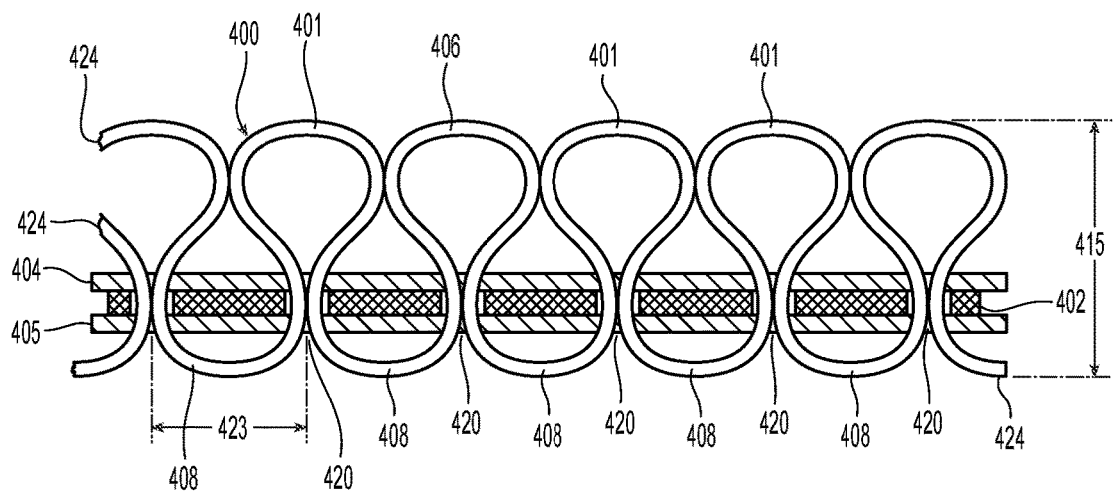
FIG. 11 is a schematic representation of a cross-section of an embodiment of a tufted fabric.

Referring to FIG. 11, in one embodiment, the fabric is a tufted fabric 400 containing a primary backing 402. Suitable primary backings are known and available in the art. In one embodiment, the primary backing includes low melt components. In one embodiment, the fabric includes at least one of a first optional layer 404 and a second optional layer 405. In one embodiment, the first optional layer contains a low-melt adhesive and is placed on a first side of the primary backing. In one embodiment, the second optional layer contains a low-melt content is placed on a second side of the primary backing opposite the first side. In one embodiment, both the first and second optional layers are placed on the same side of the primary backing with the first optional layer disposed between the primary backing and the second optional layer.

The fabric contains a plurality of yarns, and each given yarn 406 in the plurality of yarns forms the plurality of upper level "pile" loops 401 corresponding to the first face on a first side of the primary backing and a plurality of lower level "backlap" loops 408 corresponding to the second face on the second side of the primary backing. The upper level loops and lower level loops extend between pairs of interlooping points 420. In the tufted fabric, the interlooping points correspond to tufting points of the yarn through the primary backing. Therefore, the upper level loops, i.e., yarn pile loops, and lower level loops, i.e., back-lap loops, are tufted into the primary backing. The interlooping distance 423 is the spacing between the tufting points in either the first direction across the fabric or the second direction perpendicular to the first direction. The tufting points have a relatively wide spacing between adjacent tufting points. The fabric, as tufted, has a resulting initial thickness 415.

As discussed above with respect to the knit or woven fabric and illustrated in FIG. 2, the tufted fabric 400 including the primary backing and any optional low melt layers can be sufficiently calendered flat to inter-bond all loops, the primary backing and the optional layers, and to stabilize the cut edges 424. The tufted fabric can be conventionally calendered with heat and pressure at a temperature above the low melt elements in the primary backing, first layer and second layer and lower than the melting temperature of the yarns in the yarn pile loops and back-lap loops. However, stability of the tufted fabric is not achieved until the thickness of the fabric is reduced to a calendered dimension that is significantly less than the original thickness 415, resulting in a tufted fabric that loses its bulk, softness, and cushion and has a calendered thickness that is significantly less than the initial thickness.

Figure 12:
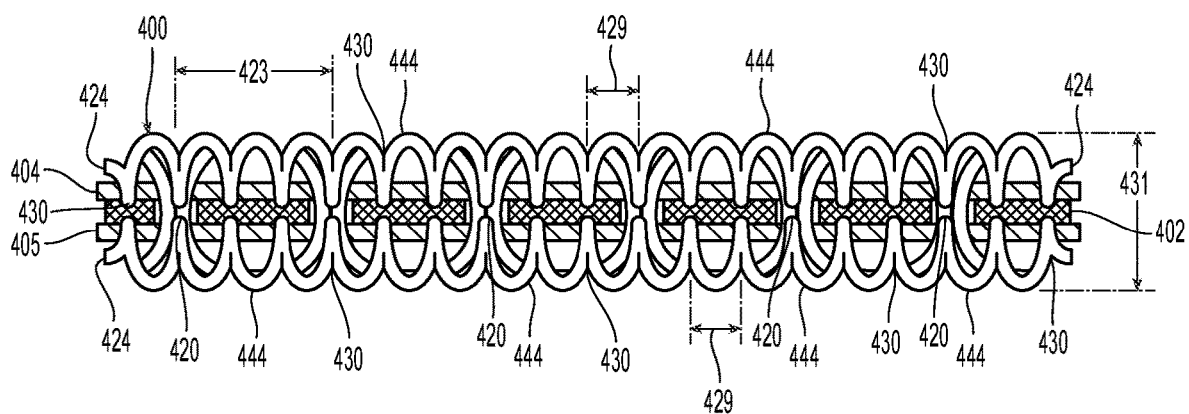
FIG. 12 is a schematic representation of the tufted fabric of FIG. 11 embossed with a micro-pattern.

Referring to FIG. 12, the tufted fabric 400 is embossed with a micro-pattern and bonded to one or more of the first and second sides of the primary backing 402 and the optional first and second layers 404, 405 at a plurality of binding points 430. The binding points extend into the primary backing and interbond the primary backing and the yarns. In one embodiment, the micro-pattern is embossed on at least one of the upper level loops on the first face of the fabric and the lower level loops on the second face of the fabric. In one embodiment, the micro-pattern is embossed on both the upper level loops on the first face of the fabric and the lower level loops on the second face of the fabric. Suitable micro-patterns and methods for embossing micro-patterns are disclosed herein. In one embodiment, separate binding points are created on the first side and the second side of the primary backing. In another embodiment, each binding point passes completely through the primary backing, from the first side to the second side; therefore, a given binding point binds the yarn at a given location on either side of the primary backing.

In general, the micro-pattern repeats at intervals corresponding to the binding point distance 429 between binding points. The intervals between bonding points are smaller than the relatively wide spacing 423 between adjacent tufting points, i.e., the binding point distance is less than the interlooping distances 423. The upper level loops and lower level loops are compressed and partially collapsed, and a plurality of new shallower and irregular loops 444 are created. In one embodiment, the shallower loops have varying heights and randomly varying shapes. The fabric has a micro-pattern embossed thickness 431 that represents a reduction of from about 20% to about 60% from the original thickness 415. In one embodiment, at least 40% and preferably at least 80% of the original thickness 415 is maintained. At least one of the first face and the second face of the fabric maintains a loopy structure, and the cut edges 424 are stable.

In one embodiment, the tufted fabric embossed and stabilized with the micro-pattern as illustrated in FIG. 12, is subsequently embossed with a macro-pattern (not shown). Suitable macro-patterns and methods for embossing with a macro-pattern are discussed herein and illustrated in FIGS. 5-8. The macro-pattern produces elevated areas and depressed areas; however, the tufted fabric also contains the plurality of bonds 430 and micro-pattern loops 444 of the micro-pattern embossing on both the first face and the second face. The result is a macro-patterned tufted fabric with stable elevated areas and stabilized edges. The new loops 444 at the elevated areas maintain their looped textile aesthetic. The tufted fabric has a resulting overall thickness comparable to a tufted fabric that has been embossed with only a macro-pattern, i.e., no micro-pattern embossing.

Exemplary embodiments are also directed to textile composites containing the micro-pattern and macro-pattern embossed fabrics are disclosed herein. In one embodiment, the fabric includes a plurality of yarns forming a plurality of loops. The loops in the plurality of loops are stabilized at a plurality of interlooping points spaced across the fabric by interlooping distances between pairs of interlooping points. An embossed micro-pattern is disposed on a first face of the fabric. This embossed micro-pattern includes a plurality of binding points extending into the first face and binding yarns in the plurality of yarns. Adjacent binding points in the plurality of binding points are separated by a binding point distance that is less than the interlooping distances. The textile composite also includes a cushioning backing attached to a second face of the fabric opposite the first face. In one embodiment, the cushioning backing is attached using adhesive. Suitable cushioning backings are known an available in the art.

In one embodiment, the fabric is a knit fabric or a woven fabric and includes a sub-layer in contact with the second face of the fabric opposite the first face. The binding points in the plurality of binding points extend into the sub-layer and interbond the sub-layer and the yarns. In one embodiment, the fabric is a stitchbonded fabric that includes a substrate. The interlooping points in the plurality of interlooping points are points of insertion of the plurality of loops through the substrate, and the interloping distance is the spacing between the points of intersection in either a length direction or a width direction across the fabric. The binding points extend into the substrate and interbond the substrate and the yarns.

In one embodiment, the fabric is a tufted fabric having a primary backing. The interlooping points in the plurality of interlooping points are tufting points through the primary backing, and the interloping distance is the spacing between the tufting points in either a length direction or a width direction across the fabric. The binding points extend into the primary backing and interbond the primary backing and the yarns. In one embodiment, the textile composite is embossed with a macro-pattern separate from the micro-pattern. The macro-pattern has a plurality of elevated areas and a plurality of depressed areas that establish a desired aesthetic in the textile composite. Adjacent elevated areas and adjacent depressed areas are separated by a spacing interval, and the spacing interval is greater than the interlooping distances.

Figure 13:
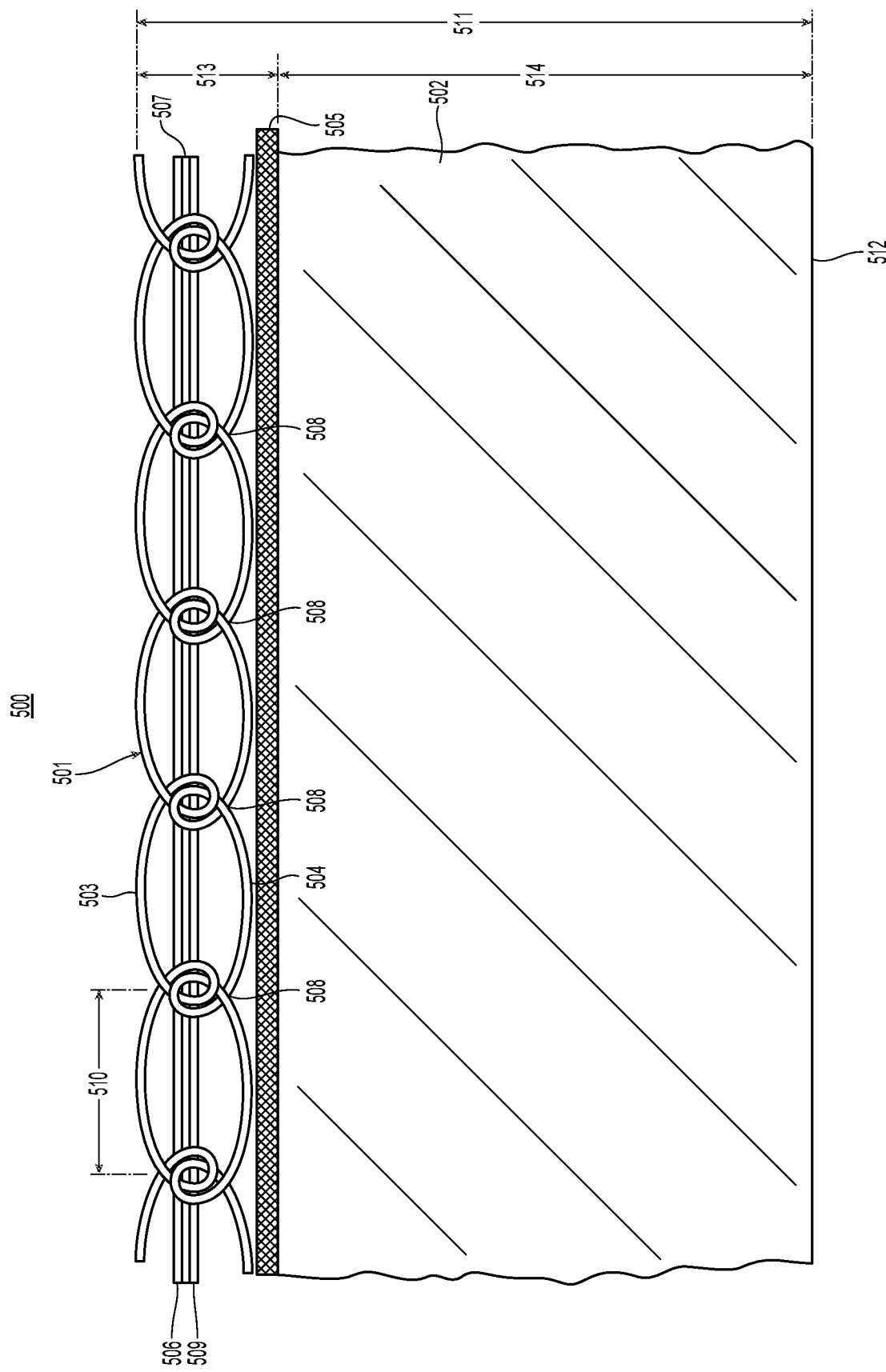
FIG. 13 is a schematic representation of a cross-section of a textile composite of a looped fabric placed over an adhesive layer and a cushioning backing.

Referring now to FIG. 13, an exemplary embodiment of a textile composite 500 is illustrated. As illustrated, the fabric is a looped yarn fabric 501 such as, for example, the looped yarn fabric illustrated in FIG. 1. The looped yarn fabric includes the optional sublayer 505 and a thick cushioning backing layer 502. While illustrated as a looped yarn fabric such as the knit fabric of FIG. 1, suitable looped yarn fabrics for the face layer include the fabric illustrated in FIGS. 9 and 11 and described above. In one embodiment, the looped yarn fabric face layer includes a top face 503 and a back face 504 opposite the top face. In one embodiment, the looped yarn fabric face layer 501 includes an optional internal low-melting layer 507 disposed between the top face and the back face. In one embodiment, the internal low-melting layer is equivalent to the substrate 322 of FIG. 9 or the primary backing 402 of FIG. 11. The looped yarn fabric can also be a woven fabric, optionally containing low melt yarns, partially or totally, in the weft or warp direction, or both directions.

In one embodiment, the looped yarn fabric face layer includes a first or upper internal low-melt layer 506 and a second or lower internal low-melt layer 509 in addition to the internal low-melting layer 507. The internal low-melting layer is disposed between the upper internal low-melt layer and lower internal low-melt layer. In one embodiment, the upper and lower extra internal low-melt layers 506 and 509 are equivalent to the extra internal layers 326 or 327 of FIG. 9, or the extra internal layers 404 or 405 of FIG. 11. In embodiments where the looped yarn fabric face layer is a knit or woven loopy fabric such as fabric 100, depicted schematically in FIG. 1, the internal low-melting layer 507 and the upper and lower extra internal low-melt layers 506 and 509 are not included in the looped yarn fabric face layer. Suitable internal low-melt layers include, but are not limited to, films, flat woven fabrics, nonwoven fabrics and felts. In general, yarns form the top face 503 and bottom face 504 of the looped yarn fabric face layer 501. Suitable yarns in the fabric include, but are not limited to, polyamide or nylon, polypropylene, polyolefin, acrylic, polyester, wool and cotton. Preferably, the yarns are polyester. The internal layers, when included, are attached to and support the yarns.

In one embodiment, the yarns form a plurality of loops running along the fabric, forming the "loops or tufts" of the upper layer for a tufted fabric, or the "overlaps" for a knit or stitch-bonded fabric, or the top and bottom of a woven fabric. The yarns also form the back layer with "back-laps" for tufted fabrics or "under-laps" for knit or stitch-bonded fabrics. The interlooping points 508 represent the points of inter-looping of yarns or the points at which the yarns pass through the substrate, primary-backing or optional inner layers. These interlooping points form a regular pattern across the length and width, i.e., the area, of the looped yarn fabric face layer 501. The spacing or interlooping distance 510, in either the length or width of the looped yarn fabric face layer 501, between any two interlooping points is referred to as the "interval of loop repetition".

The textile composite 500 has an initial total or accumulated thickness 511 extending from the back or bottom face 512 of cushioning backing layer 502 to the top face 503 of the looped yarn fabric face layer 501. The total thickness includes backing or cushioning layer thickness 514 and face layer thickness 513. The cushioning layer thickness 514 is usually substantially greater than the face layer thickness 513. When the looped yarn fabric face layer 501 does not contain the internal low-melting layer 505 or the upper and lower extra internal low-melt layers 506 and 509, the textile composite 500 may include the separate low-melting adhesive sub-layer 505 placed between the bottom face 504 of looped yarn fabric face layer 501 and the backing layer 502 to facilitate attachment of the looped yarn fabric face layer 501 to the backing layer 502. As another option the baking layer 502 may contain sufficient low-melting polymer to achieve bonding without a separate adhesive layer 505.

Figure 14:
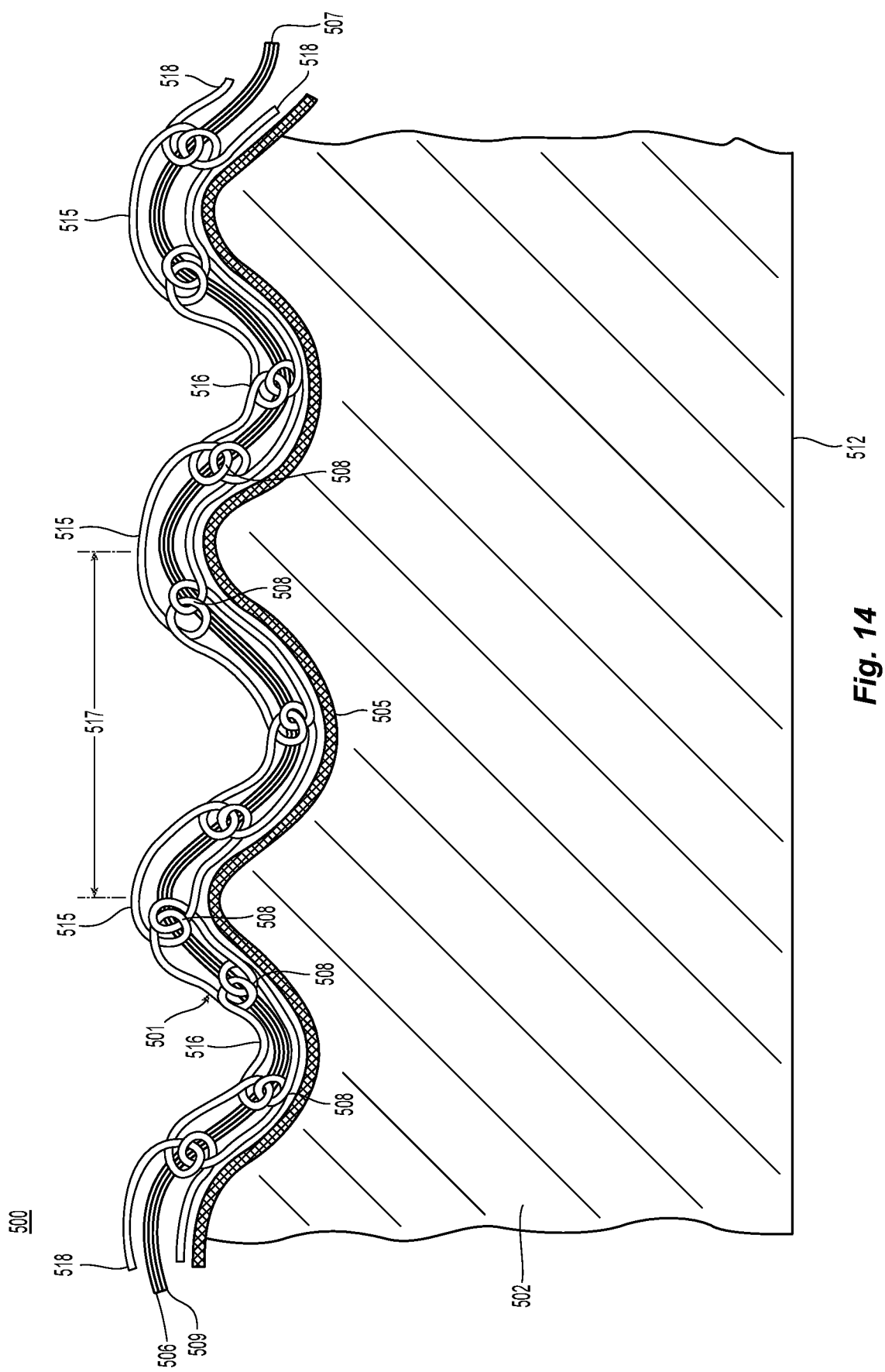
FIG. 14 is a schematic representation of the textile composite of FIG. 13 embossed and laminated to produce a macro-pattern.

Referring now to FIG. 14, the textile composite 500 of FIG. 13 is directly embossed with a macro-pattern. The looped yarn fabric face layer 501 and the backing layer 502 pre-assembled as illustrated in FIG. 13 are embossed with the macro-pattern to produce elevated areas 515 and depressed areas 516 and a given large spacing interval 517 between adjacent elevated areas of the macro-pattern. The elevated areas 515 in the macro-pattern are not stabilized. When cut edges 518 are formed in the textile composite 500, these cut edges can pass through the spacing 510 between adjacent points of attachment 508. Since the yarns running along the cut edge are not sufficiently anchored to each other or to an intermediate layer, unraveling and fuzzing can occur, and the surface stability and abrasion resistance overall may be unsatisfactory.

Figure 15:
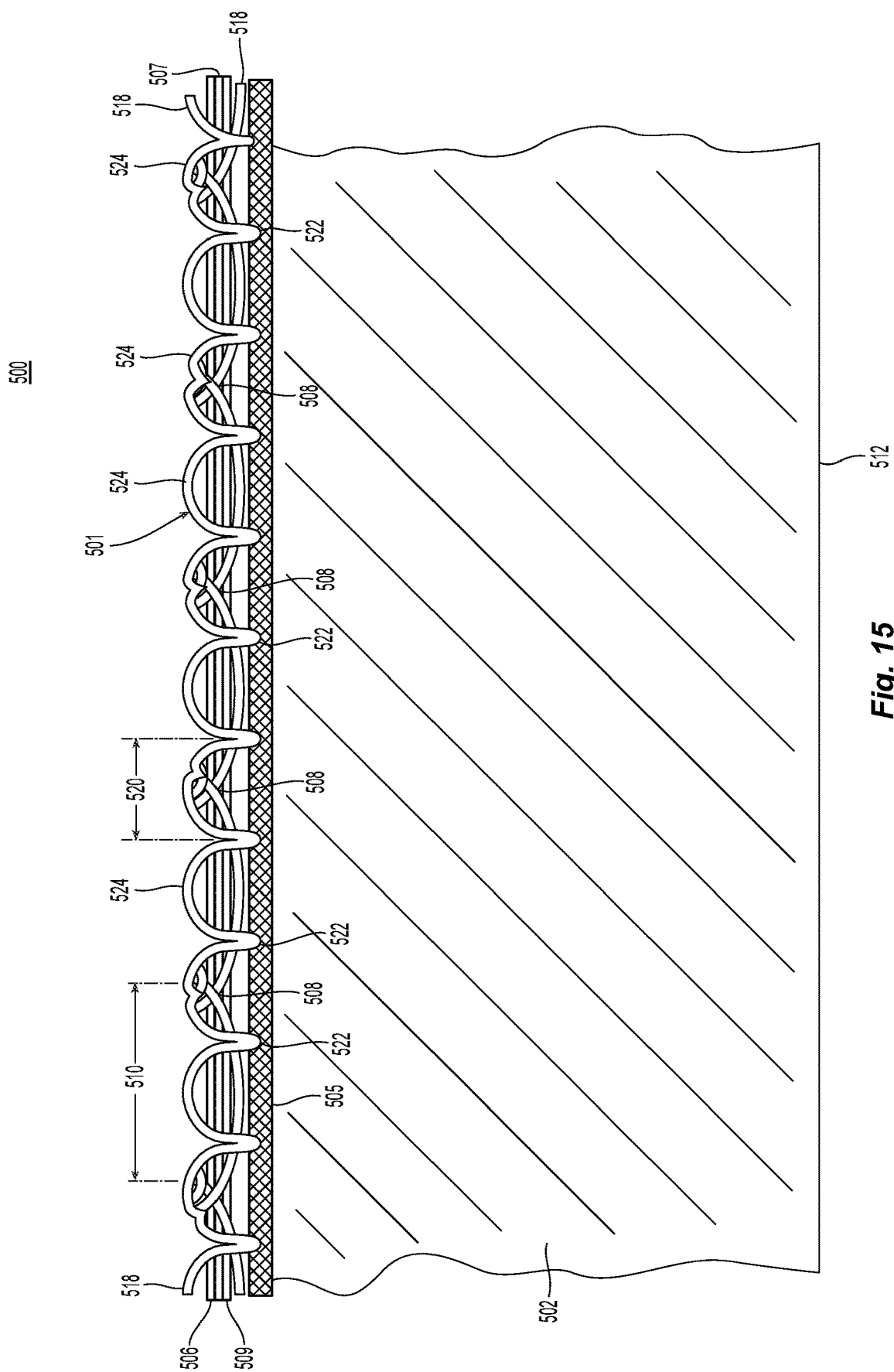
FIG. 15 is a schematic representation of a textile composite formed by embossing and laminating with a micro-pattern.
Figure 16:
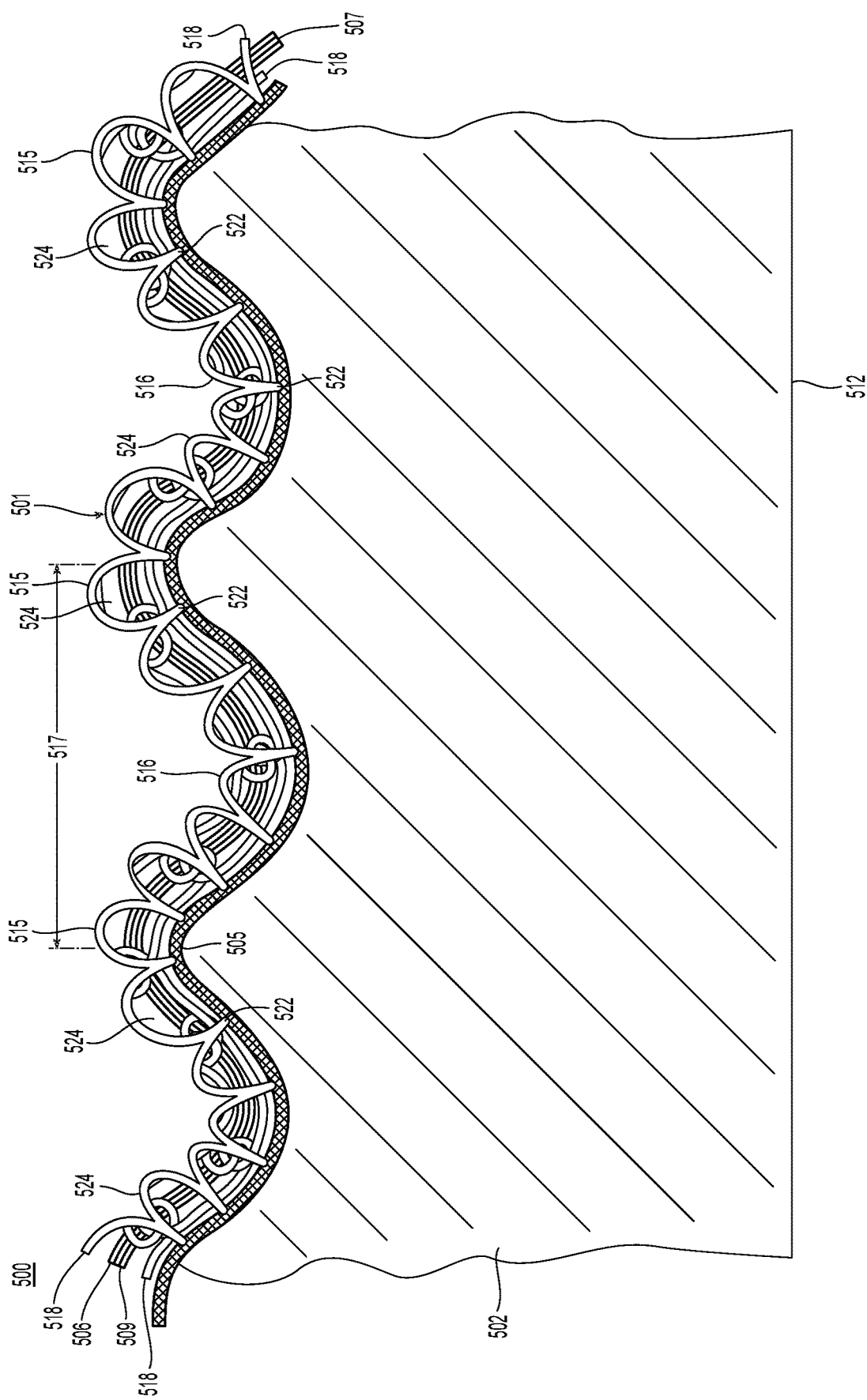
FIG. 16 is schematic representation of the textile composite of FIG. 18 post-embossed with a macro-pattern.

Referring now to FIGS. 15 and 16, exemplary embodiments of the textile composite 500 use an embossed micro-pattern either alone or in combination with the embossed macro-pattern to alleviate wear, abrasion, deterioration of the integrity of the textile composite and unraveling and fuzzing within the attachment intervals, at cut edges. In one embodiment, the micro-pattern is embossed on the combined face fabric layer and backing layer, creating a textile composite having a loopy but relatively flat surface. In one embodiment, the textile composite 500 is embossed with a heated tool (not shown) having projections spaced with at intervals in accordance with the binding point distance 520 applied directly from the top face 503, to produce a plurality of bonds 522 that repeat at regular or random intervals defined by the binding point distance 520. These intervals are smaller than the interlooping distances 510 between interlooping points 508. The looping yarns are transformed into shallower irregular micro-pattern loops 524 with the micro-pattern repeating at intervals defined by the binding points distances 520 between binding points 522. The micro-pattern loops have randomly varying shapes. In one embodiment, the binding points extend into the sub-layer 505. In another embodiment, the binding points extend into the backing layer 502. The yarns in the fabric face layer are stabilized in the fabric face layer 501 and are attached to the sub-layer and backing. In addition, any substrate, primary-backing or optional low melt layers are also attached to the backing. The resulting textile composite is stable at the cut edges 518.

Referring to FIG. 16, the textile composite 500 embossed with the micro-pattern is subsequently embossed with the macro-pattern. The embossed micro-pattern stabilizes the yarns ion the fabric, and the embossed macro-pattern creates a desired aesthetic face texture and produces properties in the textile composite such as slip resistance and face cushion. The composite 500 is re-embossed with a coarser macro-pattern having elevated areas 515 separated by the large spacing interval 517. The micro-pattern modifies but does not eliminate the desired loop aesthetics and feel, which are also retained after the second embossing or re-embossing with the macro-pattern.

Suitable methods for applying any of the micro-patterns and macro-patterns discussed herein include, but are not limited to, using a heated embossing roll or plate, simultaneously activating the low-melt layers and bonding the face fabric to the substrate. A soft back up tool is not required if the backing is sufficiently deep and conformable. In one embodiment the micro-embossed fabrics shown in FIG. 3, 10 or 12 are used as face layers in the textile composite, which is then embossed with the macro-pattern and simultaneously attached to the cushioning backing.

Exemplary embodiments are also directed to methods for stabilizing fabrics and textile composites containing those fabrics. A fabric is created that contains a plurality of yarns forming a plurality of loops. The loops in the plurality of loops are stabilized at a plurality of interlooping points spaced across the fabric by interlooping distances between pairs of interlooping points. A first face of the fabric is embossed with a micro-pattern having a plurality of binding points extending into the first face and binding yarns in the plurality of yarns. Adjacent binding points in the plurality of binding points are separated by a binding point distance, and the binding point distance is less than the interlooping distances.

In one embodiment, the fabric containing the micro-pattern is embossed with a macro-pattern separate from the micro-pattern. The macro-pattern produces a plurality of elevated areas and a plurality of depressed areas that establish a desired aesthetic in the fabric. Adjacent elevated areas and adjacent depressed areas are separated by a spacing interval, and the spacing interval greater than the interlooping distances.

Figure 17:
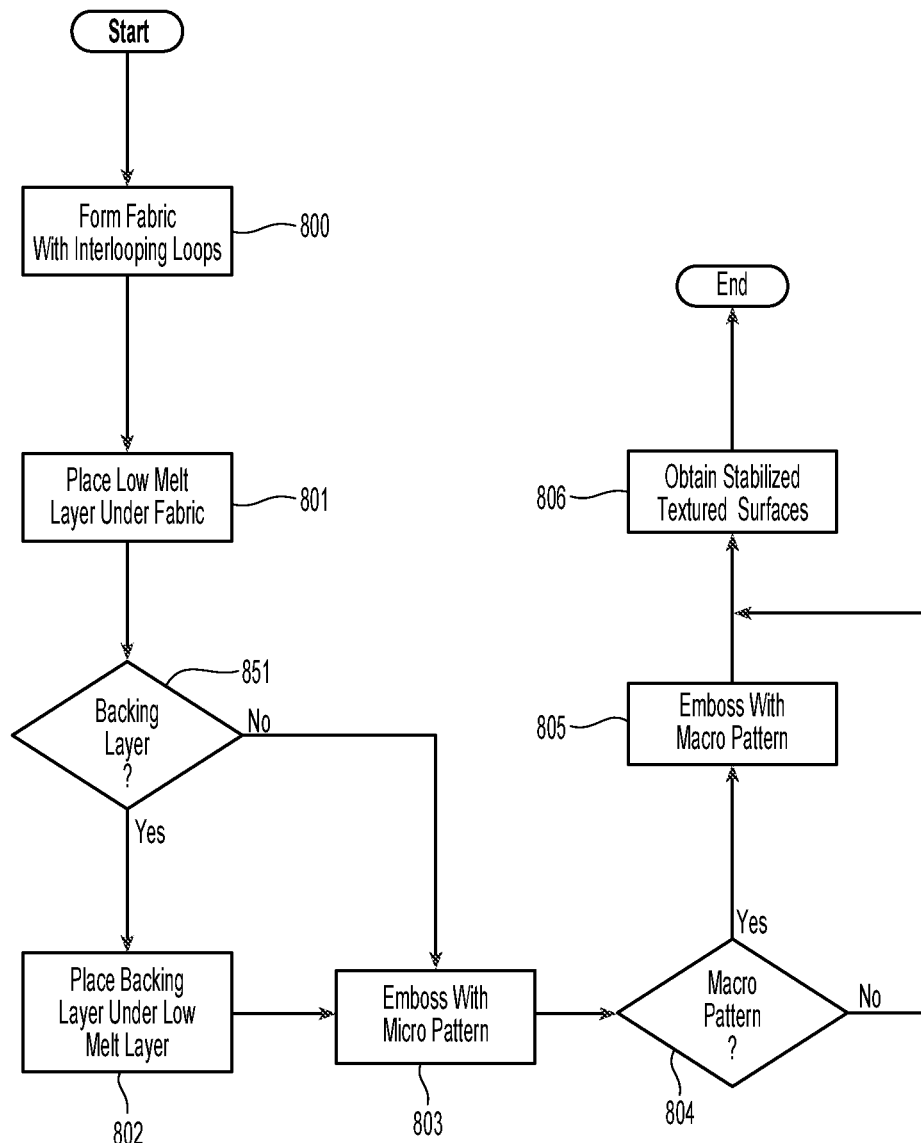
FIG. 17 is a flow chart illustrating an embodiment of a method for stabilizing a looped yarn fabric or textile composite.
Figure 18:
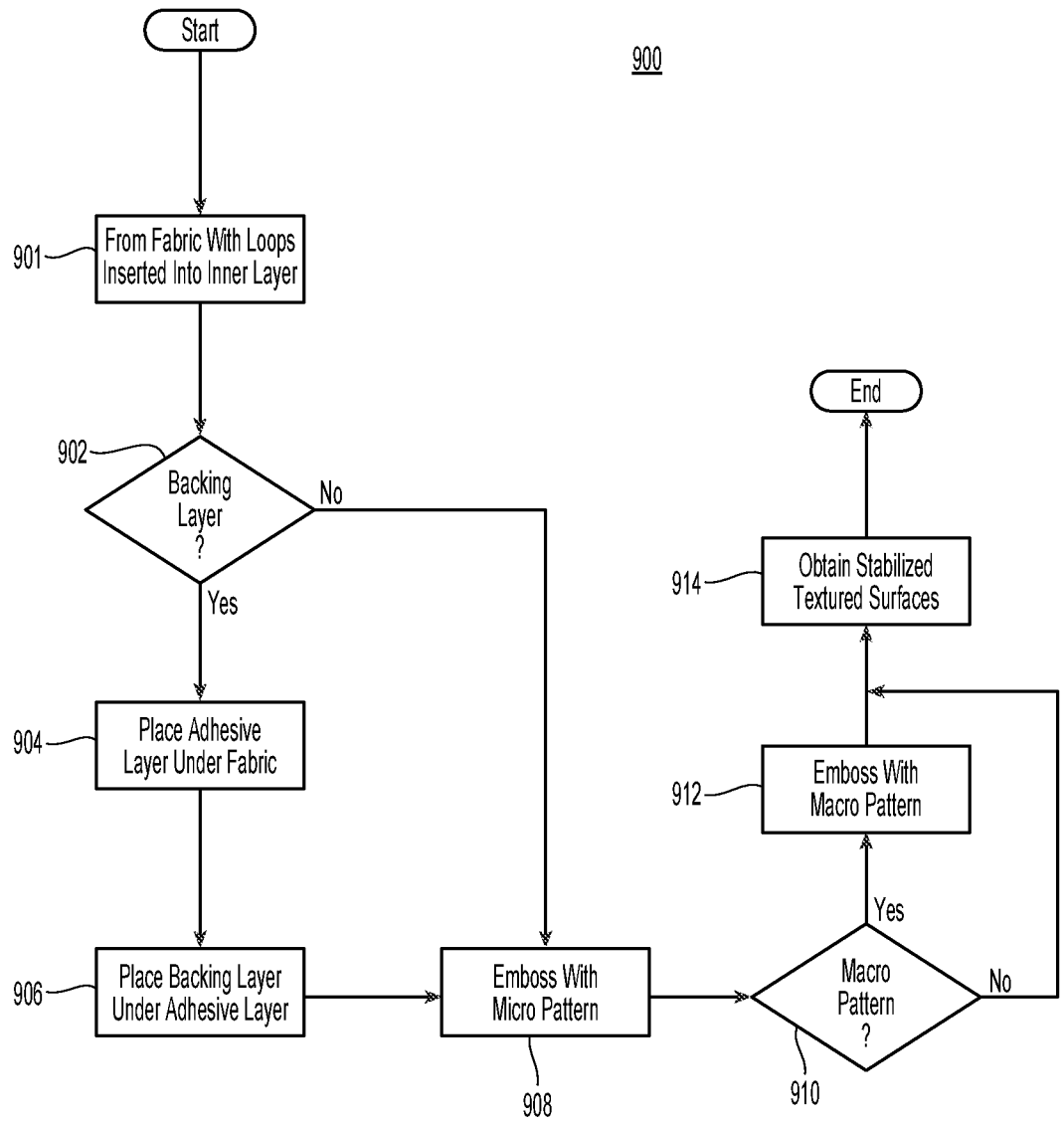
FIG. 18 is a flow chart illustrating another embodiment of a method for stabilizing a looped yarn fabric or textile composite.

Referring now to FIGS. 17 and 18, exemplary embodiments of methods for stabilizing a textile fabric formed with looping yarns, or a composite having a face fabric formed with looping yarns are illustrated. FIG. 17 illustrates a method applicable to looped fabrics and composites containing looped fabrics without a low-melting inner layer. FIG. 18 illustrates a method applicable to looped fabrics and composites containing looped fabrics formed with an inner low melting layer. All embodiments form a textile fabric with inter-engaging yarn loops, i.e., interlooping yarns.

Referring to FIG. 17, a method 850 for creating and stabilizing looped fabrics or composites containing looped fabric face layers is illustrated. A looped fabric containing interlooping loops is formed 800. Suitable looped fabrics include, but are not limited to, woven fabrics and knit or tufted fabrics. In one embodiment, the looped fabric is formed without an intermediate internal layer. In one embodiment, at least one low melt sheet, e.g., a sub-layer, is placed under the looped fabric 801. The looped yarn fabric can be stabilized alone or as part of a textile composite. Therefore, a determination is made regarding whether or not additional layers such as a cushioning backing layer are to be combined with the looped fabric and any low melt layer 851. If a backing layer is to be added, then the backing layer is placed underneath the low melt layer 802 such any low melt sub-layer is between the cushioning backing layer and the looped fabric face layer.

If no backing layer is to be added or after the backing layer is added, the looped fabric and low melt layer or the textile composite containing the looped fabric is embossed with a micro-pattern. Suitable micro-patterns and methods for embossing micro-patterns are discussed herein. Embossing with a micro-pattern yields a stabilized relatively flat micro-textured looped fabric or a textile composite with a flat micro-patterned and micro-textured looped fabric face layer.

A determination is then made regarding whether the micro-patterned looped fabric or the micro-pattern textile composite is to be embossed with a macro-pattern 804 to yield a three-dimensional fabric or a textile composite with a three-dimensional fabric face layer. If embossing with the macro-pattern is to be done, then the looped fabric with the micro-pattern or the textile composite with the micro-pattern of step is embossed with the desired macro-pattern 805. Suitable macro-patterns and methods for embossing macro-patterns are disclosed herein. Stabilized textured surfaces are then obtained 806. In summary, embossing with a micro-pattern yields flat looped fabrics stabilized with the micro-pattern or textile composites with looped face fabrics stabilized by the micro-pattern, whereas embossing with the macro-pattern yields three-dimensional looped fabrics pre-stabilized with micro-embossing and converted into a three-dimensional structure by macro-embossing or textile composites having looped face fabrics pre-stabilized by micro-embossing and embossed with a three-dimensional face contour.

Referring now to FIG. 18, a method 900 for creating and stabilizing a fabric with loops inserted into an inner layer or textile composites containing a fabric with loops inserted into an inner layer is illustrated. A fabric with loops inserted into an inner layer is formed 901 by yarns penetrating through a low-melt internal layer at regular intervals, e.g., a stitch-bonded fabric formed with an inner substrate layer or a tufted fabric formed with an internal primary-backing layer. A determination is then made regarding whether to add a cushioning backing layer 902 if the fabric is going to be part of a textile composite. If the backing layer is to be added, an adhesive layer is placed under the fabric 904 and a backing layer is placed under the adhesive layer 906.

The fabric or the textile composite is embossed with a micro-pattern. Suitable micro-patterns and methods for embossing with micro-patterns are disclosed herein. In one embodiment, embossing with the micro-pattern is conducted at a temperature higher than the melting temperature of the inner low-melt layer. Embossing with the micro-pattern yields a relatively flat stable fabric with loops inserted into an inner layer with modified loops on the surface.

A determination is then made regarding whether a coarser macro-pattern is to be embossed on the micro-pattern stabilized composite or the micro-pattern stabilized fabric 910. If a macro-pattern is to be formed, then the fabric or the textile composite is embossed with a macro-pattern 912. Suitable macro-patterns and method for embossing a macro-pattern are discussed herein. Therefore, stabilized textured surfaces are obtained 914. In summary embossing with a micro-pattern yields micro-embossed stabilized looped fabrics or textile composites with face layers containing stabilized loop fabrics, whereas embossing the macro-pattern yields there-dimensional looped fabrics stabilized with micro-embossing and converted three-dimensional structures formed by macro embossing or textile composites with pre-stabilized looped fabrics embossed with a three-dimensional texture.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A textile composite comprising:
   a fabric comprising:
   a plurality of yarns forming a plurality of loops, the plurality of loops interconnected at a plurality of interlooping points spaced across the fabric by interlooping distances between pairs of interlooping points; and
   an embossed micro-pattern disposed on a first face of the fabric, the embossed micro-pattern comprising a plurality of binding points extending into the first face and binding yarns in the plurality of yarns, adjacent binding points in the plurality of binding points separated by a binding point distance, the binding point distance less than the interlooping distances; and
   a cushioning backing attached to a second face of the fabric opposite the first face.

2. The textile composite of claim 1, wherein:
   the fabric comprises a knit fabric or a woven fabric; and
   the fabric further comprises a sub-layer in contact with the second face of the fabric, the plurality of binding points extending into the sub-layer and interbonding the sub-layer and the yarns.

3. The textile composite of claim 1, wherein:
   the fabric comprises a stitchbonded fabric comprising a substrate, the plurality of interlooping points comprising points of insertion of the plurality of loops through the substrate, the interloping distance comprising spacing between the points of intersection in either a length direction or a width direction across the fabric; and
   the binding points extend into the substrate and interbond the substrate and the yarns.

4. The textile composite of claim 1, wherein:
   the fabric comprises a tufted fabric comprising a primary backing, the plurality of interlooping points comprising tufting points through the primary backing, the interloping distance comprising spacing between the tufting points in either a length direction or a width direction across the fabric; and
   the binding points extend into the primary backing and interbond the primary backing and the yarns.

5. The textile composite of claim 1, wherein the textile composite further comprises an embossed macro-pattern separate from the micro-pattern, the macro-pattern comprising a plurality of elevated areas and a plurality of depressed areas that establish a desired aesthetic in the textile composite, adjacent elevated areas and adjacent depressed areas are separate by a spacing interval, the spacing interval greater than the interlooping distances.

6. The textile composite of claim 1, wherein two binding points are disposed between adjacent binding points.

7. The textile composite of claim 1, wherein three binding points are disposed between adjacent binding points.

* * * * *